United States Patent [19]
Larson

[11] 3,822,430
[45] July 9, 1974

[54] VEHICLE CONVEYING MEANS FOR VEHICLE WASHER

[75] Inventor: Sherman L. Larson, Cinnaminson, N.J.

[73] Assignee: Sherman Car Wash Equipment Co., Palmyra, N.J.

[22] Filed: Dec. 17, 1971

[21] Appl. No.: 209,134

[52] U.S. Cl. ............. 15/21 R, 15/DIG. 2, 15/21 E, 134/123
[51] Int. Cl. .................................................. B60s 3/04
[58] Field of Search ............ 15/DIG. 2, 21 R, 21 D, 15/21 E, 53, 97; 134/45, 123; 104/162, 172 B

[56] References Cited
UNITED STATES PATENTS

| | | | |
|---|---|---|---|
| 3,058,133 | 10/1962 | Haverberg | 15/21 R |
| 3,233,264 | 2/1966 | Nickl et al. | 15/21 E |
| 3,438,077 | 4/1969 | Eubanks | 15/21 E |
| 3,579,701 | 6/1968 | Crisp, Jr. | 15/21 E |

FOREIGN PATENTS OR APPLICATIONS 1,577,464   6/1969   France

*Primary Examiner*—Edward L. Roberts
*Attorney, Agent, or Firm*—Seidel, Gonda & Goldhammer

[57] ABSTRACT

A vehicle washer utilizing a shortened track for the frame carrying the washing elements such as nozzles and/or brushes. The vehicle is moved in a direction opposite to the direction of movement of the frame as the frame traverses the length of the vehicle. As the frame moves backward along the length of the car, the car is moved forward by a vehicle moving or carrier means. As the frame moves forward along the length of the vehicle, the vehicle is moved backwards by the vehicle moving or carrier means.

13 Claims, 5 Drawing Figures

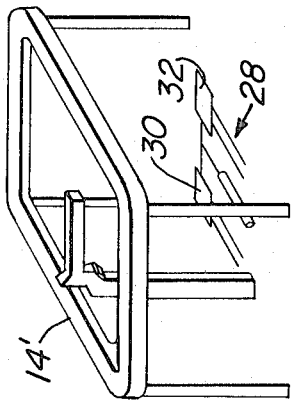
FIG. IA
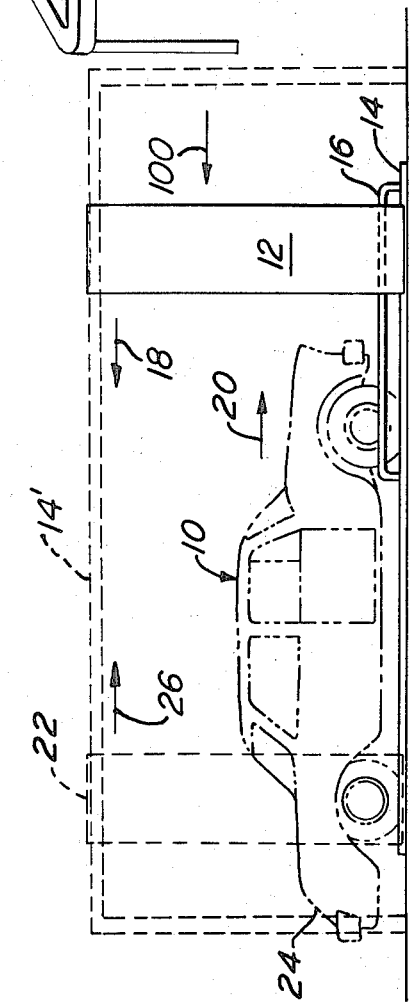
FIG. I
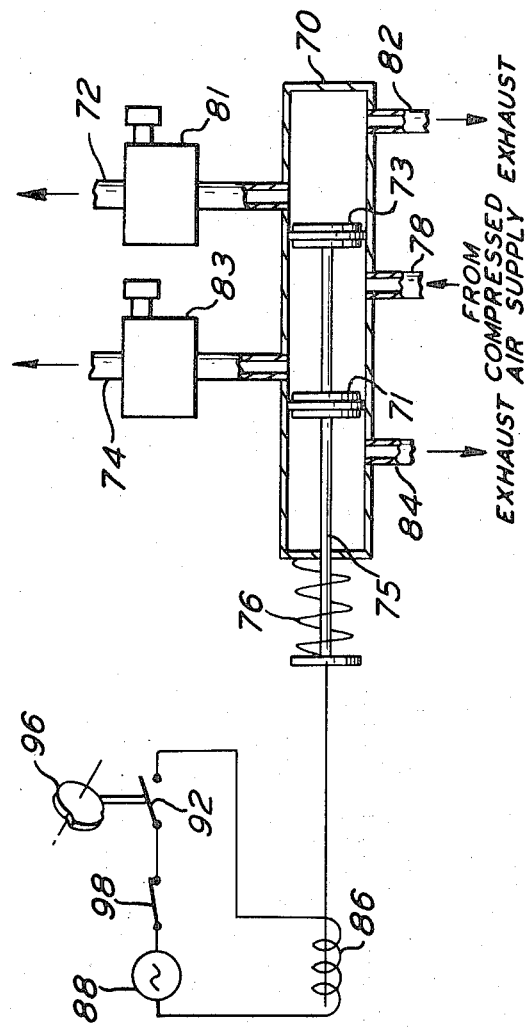
FIG. 5
INVENTOR
SHERMAN L. LARSON
BY
Seidel, Gonda & Goldhammer
ATTORNEYS.

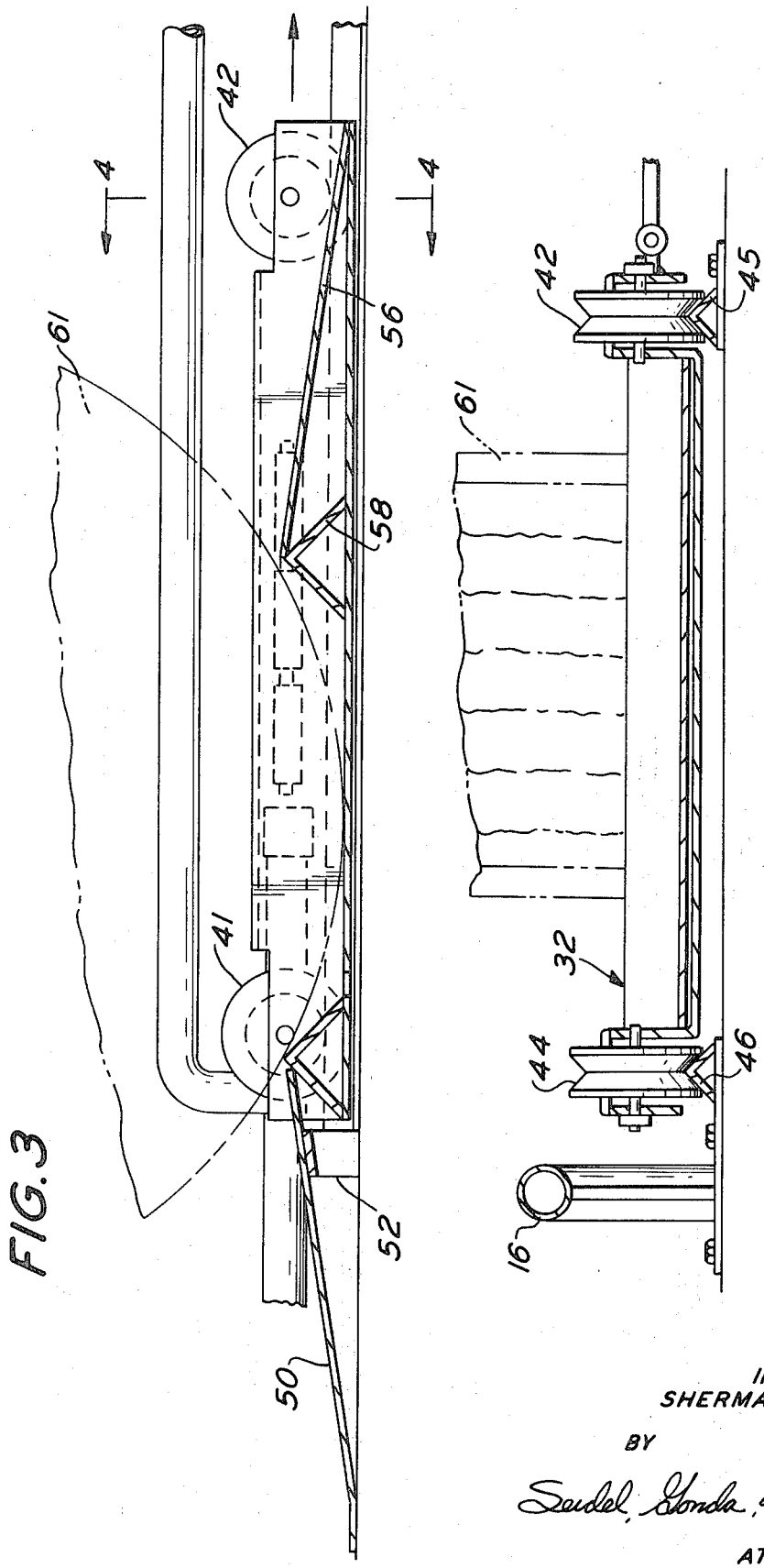

VEHICLE CONVEYING MEANS FOR VEHICLE WASHER

This invention relates to a vehicle conveying means for a vehicle washer. More particularly, the present invention relates to a vehicle washer wherein the vehicle being washed is moved in a direction opposite to the frame which traverses the vehicle.

A serious problem in the automatic car wash industry is the locating of sufficient space in urban areas in which to install the automatic car wash equipment. Conventional and commonly used automatic car wash equipment is provided with an inverted U-shaped frame carrying a plurality of washing elements which may be, by way of example, rotating brushes and/or spray nozzles. This frame traverses the vehicle from end to end in order to enable the washing of the car. The frame must actually travel a few feet beyond the front and a few feet beyond the rear of the vehicle being washed in order to enable cleansing of the grille and rear end, respectively. The legs of the inverted U-shaped frame are usually provided with rollers which ride on tracks mounted on the floor of the car wash building. These tracks must therefore extend a few feet beyond the front and rear bumpers of the longest vehicle to be washed. In practice, this may require a track length of 28 feet for the washing of passenger vehicles or automobiles alone. By using the present invention, this minimum required length may be shortened to 24 feet by moving the car a distance of only four feet. If a shorter length is desired, the car may be moved a longer distance. However, the distances recited herein are by way of specific example only, and are not intended to be limiting as these distances may vary considerably depending upon the design of the washing machine.

The present invention may also be used to shorten the minimum required length of the area needed to install washing machines of the overhead suspended frame type and the closed loop type. The overhead suspended frame type of washing machine is well known in the art and consists basically of a frame having washing means suspended from a track or tracks to which it is mounted by means of rollers or sprockets.

The closed loop type of washing apparatus comprises basically a closed suspended overhead track with a washing means frame suspended therefrom. The frame suspended from the track moves about the path formed by the overhead suspended closed track. Although the frame may take on various shapes and be provided with various types of washing means such as brushes and/or nozzles, in one form, the frame may be an L-shaped frame. Both legs or branches of the L-shaped frame may be provided with nozzles only. One leg of the L-shaped frame may be used to wash the vertical panels of the vehicle, and the other leg of the L-shaped frame used to wash the horizontal panels of the vehicle such as the roof and hood. In the past, the suspended overhead closed track had to form a closed loop which was large enough to encircle the largest vehicle to be washed. By using the present invention, the size of the loop may be substantially decreased. The minimum required length of the loop may be shortened as follows. As the L-shaped frame traverses the vehicle from front to rear, the vehicle is moved forward. Similarly, as the L-shaped frame traverses the vehicle from rear to front along the other side of the vehicle, the vehicle is moved backwardly. In a similar manner, the minimum required width of the closed loop could be substantially decreased by driving the vehicle on to a carrier which could be moved laterally. In such an embodiment, the vehicle would be moved to the right as the L-shaped frame traversed the front of the car from right to left. Similarly, the vehicle would be moved in the opposite direction to the movement of the L-shaped frame as the L-shaped frame traversed the rear end of the vehicle.

It has been known in the prior art to place a vehicle being washed on a turntable which rotates with respect to a vertically oriented brush and horizontal and vertical spray bars. It has also been known in the prior art to use wheel washers which move in synchronism with the wheel of a vehicle for a short length of travel. However, the prior art does not teach the moving of a vehicle by a moving or carrier means in a direction opposite to the direction of travel of the frame carrying the washer brushes or other washing means in order to shorten the minimum required length of travel of the frame.

Briefly, the essence of this invention is to provide a moving or carrier means for moving the vehicle in a direction opposite to the direction of travel of the frame carrying the washer brushes, nozzles or other washing means. In one embodiment, the vehicle being washed is moved forward during the time that the frame is moved backward along the vehicle. The vehicle being washed is then moved backward as the frame is moved forward along the vehicle. In one specific embodiment, the front wheels of the vehicle being washed are driven onto wheel receiving means. The rear wheels of the vehicle are made free rotating by placing the vehicle transmission in neutral. Since the rear wheels are free to rotate, the vehicle is made to travel back and forth by means of the front wheels being in the wheel receiving means. Other embodiments include one or more wheels placed on a carrier, means attaching to the vehicle for pulling the vehicle or means for engaging the vehicle and pushing the vehicle.

For the purpose of illustrating the invention, there are shown in the drawings forms which are presently preferred; it being understood, however, that this invention is not limited to the precise arrangements and instrumentalities shown.

FIG. 1 is an elevation view of a vehicle in a car wash of the present invention.

FIG. 1A is a top perspective view of a closed loop-type car wash comprising the present invention.

FIG. 3 is a cross-sectional view taken along line 3—3 of FIG. 2.

FIG. 4 is a cross-sectional view taken along line 4—4 of FIG. 3.

FIG. 5 is a cross-sectional view of a directional control valve and a schematic of circuitry associated therewith as used in the present invention.

Figure 2:
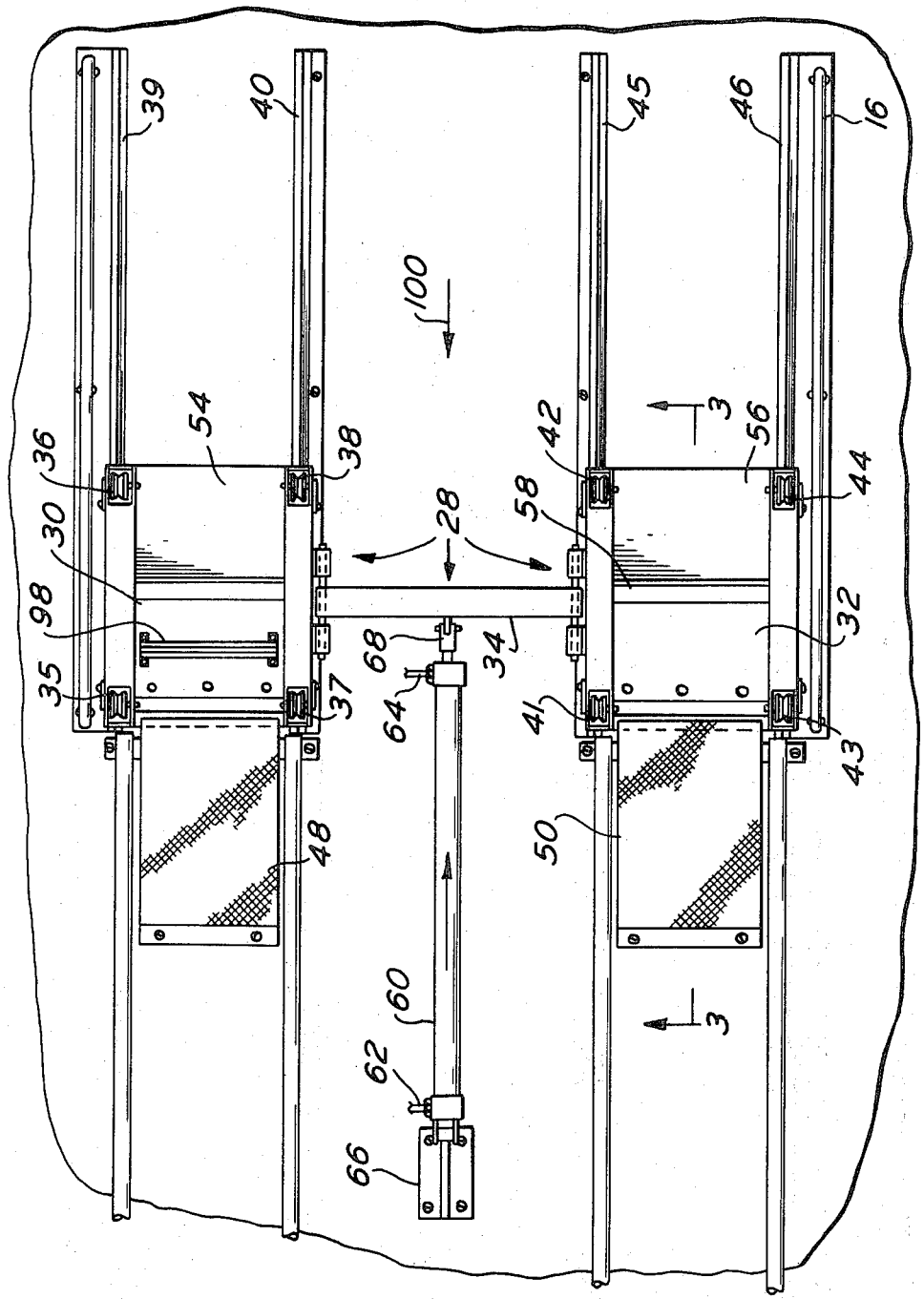
FIG. 2 is a top view of the wheel receiving means of the present invention.

Referring now to the drawings in detail, wherein like numerals indicate like elements, there is shown in FIG. 1 a floor or other supporting surface upon which is located vehicle 10 to be washed. A frame 12 carrying brushes (not shown) for washing the vehicle 10 is mounted on tracks 14 which are on the floor. A tire guide rail 16 is provided to prevent the vehicle from going too far to the right or left. As frame 12 is moved rearwardly in the direction of arrow 18, the vehicle 10 is moved forwardly in the direction of arrow 20. Eventually, frame 12 reaches its rearward most limit of travel shown in dotted outline form 22. At this time, vehicle 10 will be in its most forward position thereby enabling washing of the rear 24 of the vehicle. The frame 12 will then be moved forward as shown by arrow 28 and the vehicle 10 moved rearwardly.

Referring now to FIG. 2, there is shown wheel receiving means 28. Wheel receiving means 28 may take on a variety of forms. For example, it may be a unitarily formed trough in which both of the front wheels of the vehicle are placed. In the embodiment shown in FIG. 2, the wheel receiving means 28 may be comprised of a first tire receiving means 30 and the second tire receiving means 32 connected together by a bar 34. The tire receiving means 30 is provided with rollers 35–38 which ride on tracks 39 and 40. Tire receiving means 32 is provided with rollers 41–44 which ride on tracks 45 and 46. Stationary ramps 48 and 50 are provided for running the front wheels of the vehicle into tire receiving means 30 and 32, respectively. A clearer view of ramp 50 is shown in FIG. 3. As shown in FIG. 3, ramp 50 is supported on a support 52. Ramps 54 and 56 for leaving tire receiving 30 and 32, respectively, are provided. Ramp 55 supported on angle iron 58 is also shown in FIG. 3.

Referring to FIG. 4, there is shown wheels 42 and 44 riding on rails 45 and 46, respectively. A tire 61 is shown riding on tire receiving means 32.

Referring now to FIG. 2, there is shown a fluid motor on pneumatic cylinder 60. Pneumatic cylinder 60 is provided with ports 62 and 64. Pneumatic cylinder 60 is stationarily mounted at one end to the floor by means of bracket 66 and the other end is connected to bar 34 by means of connector 68.

Referring now to FIG. 5 in connection with FIG. 2, there is shown in FIG. 5 a directional control valve 70. Directional control valve 70 is provided with a port 72 which is connected to port 62 of pneumatic cylinder 60 by a hose or pipe (not shown). Port 74 of directional control valve 70 is connected to port 64 of pneumatic cylinder 60 by a suitable conduit such as a hose or pipe (not shown). Directional control valve 70 is also provided with valves 81 and 83 in series with ports 72 and 74, respectively. Valves 81 and 83 may be adjusted to regulate the air flow through them and thereby regulate the speed at which means 28 will move. Directional control valve 70 is provided with a pair of seals 71 and 73 mounted on a spring loaded rod 75. Spring tension is applied to rod 75 by means of spring 76. Directional control valve 70 is also provided with an inlet port 78 which is connected to a suitable compressed air supply (not shown) by a suitable conduit (not shown) and a pair of exhaust ports 82 and 84. Directional control valve 70 is operated by solenoid 86. Solenoid 86 is energized by means of an electrical energy source 88 through switch 92. Switch 92 is operated by cam 96. A switch 98 is also provided in series with the electrical source 88. Switch 98 is also shown on FIG. 2 and is operated when a tire is on tire receiving means 30. If a tire of a vehicle with its associated weight is not present on tire receiving means 30, switch 98 will be open and will prevent energization of the vehicle carrier system. This is an important feature for preventing injury to personnel by inadvertent actuation of the vehicle carrier system when a vehicle is not on the carrier.

In operation, a vehicle 10 may be driven so that its front wheels roll up ramps 48 and 50 and come to rest on tire receiving means 30 and 32. The presence of a tire on tire receiving means 30 closes switch 98. Cam 96 may be driven by the control stepper mechanism of the car wash system. Cam 96 will be positioned on the shaft of the stepper mechanism so as to close switch 92 after the front of vehicle 10 has been washed and frame 12 has started backward along the side of the car in the direction of arrow 18. Closing of switch 92 actuates solenoid 86 which causes bar 75 to move to the right so that seal 71 is positioned between ports 74 and 78. Air under pressure flows from port 78 to port 72 of directional control valve 70. Thus, air under pressure enters port 62 of pneumatic cylinder 60 causing the vehicle 10 to be moved forward in the direction of arrow 20. The exhaust air from pneumatic cylinder 60 exists through port 64 of pneumatic cylinder 60, enters port 74 and exits port 84 of directional control valve 70 and is exhausted to atmosphere.

After frame 12 has reached its maximum rearward travel as shown by dotted outline 22, and after the rear 24 of vehicle 10 has been washed and the frame starts forward again in the direction of arrow 26, switch 92 is opened by cam 96 causing solenoid 86 to be de-energized. De-energization of solenoid 86 allows spring 76 to move bar 75 to the left so that seal 73 is positioned between ports 72 and 78 of directional control valve 70. Air under pressure then flows from port 78 to port 74 of directional control valve 70. This air under pressure enters port 64 of pneumatic cylinder 60 causing means 28 to be moved in the direction of arrow 100 and returned to its start position. It is noted that the start position of means 28 corresponds to the condition of directional control valve 70 as shown in FIG. 5. Therefore, in the start position, air under pressure is at port 64 of pneumatic cylinder 60 maintaining means 28 in the retracted or start position.

It is therefore seen that the total minimum required, length of travel of frame 12 may be reduced by the amount of travel of means 28 and vehicle 10. It is also seen that switch 98 provides a significant safety feature by preventing unexpected movement of means 28 and thereby preventing injury to the feet or legs of personnel.

Although a specific and detailed embodiment of the invention has been described, it is understood that the present invention may be used with any of the various types of vehicle washing apparatus which use a washing means which moves with respect to the vehicle. For example, the present invention may be used with a suspended overhead washing means which reciprocates on a longitudinal track or may be used with a cyclowash apparatus as described above. In addition, the teachings of the present invention may be applied to a cyclowash apparatus to reduce the minimum required width of the closed track by practicing the present invention to move the vehicle being washed laterally. This may be accomplished by placing all of the wheels of the vehicle on a suitable carrier which moves laterally.

In addition, numerous modifications and equivalent structures fall within the teachings of the present invention. For example, although the detailed embodiment described uses a means for receiving the two front wheels of the vehicle being washed, it is understood that one, two, three or four wheels of the vehicle could be carried forward and backward. For example, one of the rear wheels could be carried by a carrier means with the other rear wheel being free rotating and the front wheels being guided by tire guides. Also, the vehicle could be pulled forward by attaching a hook or clamp to the front bumper or frame of the vehicle. Alternatively, the vehicle could be pushed by a suitable vehicle engaging means which would engage a suitable portion of the vehicle such as the bumper or frame.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. An apparatus for washing vehicles, comprising: support means, said support means supporting means for washing a vehicle and the vehicle, means for moving said washing means relative to the vehicle and said support means during washing of the vehicle; and means for moving the vehicle in a direction opposite to the direction of movement of said washing means, a portion of said moving means being fixed to said support means, and another portion of said moving means being coupled to the vehicle for moving the vehicle relative to said support means.

2. An apparatus for washing vehicles as recited in claim 1 wherein said washing means includes an inverted U-shaped frame.

3. An apparatus for washing vehicles as recited in claim 1 wherein said washing means includes a closed overhead track and a frame suspended therefrom, said frame traveling along the path of said closed overhead track during washing of the vehicle.

4. An apparatus for washing vehicles as recited in claim 1 wherein said washing means includes a frame suspended from an overhead longitudinal track means.

5. An apparatus for washing vehicles comprising: means for washing a vehicle, means for moving said washing means relative to the vehicle during washing of the vehicle; means for moving the vehicle in a direction opposite to the direction of movement of said washing means; and said vehicle moving means comprises means for carrying two front wheels of the vehicle.

6. An apparatus for washing vehicles comprising means for washing a vehicle, means for moving said washing means relative to the vehicle during washing of the vehicle; means for moving the vehicle in a direction opposite to the direction of movement of said washing means; and said vehicle moving means comprises means for carrying one wheel of the vehicle.

7. An apparatus for washing vehicles, comprising: a first pair of tracks; a frame reciprocably mounted on said first pair of tracks for movement in opposite directions with respect to a vehicle being washed, means for washing the vehicle being mounted on said frame; carrier means mounted parallel to said first pair of tracks for carrying the vehicle being washed; the movement of said frame thereby decreasing the minimum required length of said first pair of tracks.

8. An apparatus for washing vehicles as recited in claim 7 wherein said carrier moving means includes a fluid motor having a piston, a first and a second port, a directional control valve for supplying fluid under pressure to either said first port for moving said piston in a first direction or to said second port for moving said piston in a second direction.

9. An apparatus for washing vehicles as recited in claim 8 wherein said directional control valve is controlled by a solenoid, said solenoid being controlled by electrical power switched by cam controlled switches.

10. An apparatus for washing vehicles as recited in claim 9 wherein said carrier means is provided with a switch, said switch being activated when a vehicle to be washed is on said carrier means, said switch disabling said carrier moving means when a vehicle is not on said carrier means.

11. An apparatus for washing vehicles, comprising:
a first pair of tracks;
a frame reciprocably mounted on said first pair of tracks for movement in opposite directions with respect to a vehicle being washed, said frame having washing means mounted thereon for washing the vehicle;
a second pair of tracks mounted within said first pair of tracks and substantially parallel to said first pair of tracks;
means for receiving front wheels of the vehicle to be washed reciprocably mounted on said second pair of tracks; and
means for moving said front wheels receiving means in a direction opposite to the movement of said frame thereby decreasing the minimum required length of said first pair of tracks.

12. An apparatus for washing vehicles as recited in claim 11 wherein said moving means includes a fluid motor having a piston, a first and a second port, a directional control valve for supplying fluid under pressure to either said first port for moving said piston in a first direction or to said second port for moving said piston in a second direction.

13. An apparatus for washing vehicles as recited in claim 12 wherein said directional control valve is controlled by a solenoid, said solenoid being controlled by electrical power switched by a cam controlled switch.

* * * * *